US010441911B2

(12) United States Patent
Hugues (10) Patent No.: US 10,441,911 B2
(45) Date of Patent: Oct. 15, 2019

(54) V-TYPE FILTER FRAME (71) Applicant: Camfil AB, Trosa (SE)

(72) Inventor: Mathieu Hugues, Trosa (SE)

(73) Assignee: CAMFIL AB, Trosa (SE)

(*) Notice: Subject to any disclaimer, the term of this patent is extended or adjusted under 35 U.S.C. 154(b) by 141 days.

(21) Appl. No.: 15/513,931

(22) PCT Filed: Sep. 25, 2014

(86) PCT No.: PCT/EP2014/070486
§ 371 (c)(1),
(2) Date: Mar. 23, 2017

(87) PCT Pub. No.: WO2016/045731
PCT Pub. Date: Mar. 31, 2016

(65) Prior Publication Data
US 2017/0282107 A1 Oct. 5, 2017

(51) Int. Cl.
*B01D 46/00* (2006.01)
*B01D 46/12* (2006.01)

(52) U.S. Cl.
CPC ....... *B01D 46/125* (2013.01); *B01D 46/0001* (2013.01); *B01D 46/0002* (2013.01); *B01D 2271/00* (2013.01); *B01D 2275/20* (2013.01)

(58) Field of Classification Search
CPC .......... B01D 46/00–546; B01D 46/001; B01D 46/0002; B01D 46/125; B01D 2271/00; B01D 2275/20
(Continued)

(56) References Cited

U.S. PATENT DOCUMENTS

2011/0252759 A1  10/2011 Nicholas
2012/0067013 A1   3/2012 Antony et al.
(Continued)

FOREIGN PATENT DOCUMENTS

WO   WO 2012/166509   12/2012
WO   WO 2013/040010    3/2013
(Continued)

OTHER PUBLICATIONS

International Search Report and Written Opinion for International Application No. PCT/EP2014/070486 dated Jun. 8, 2015 in 10 pages.
(Continued)

*Primary Examiner* — T. Bennett McKenzie
(74) *Attorney, Agent, or Firm* — Knobbe, Martens, Olson & Bear, LLP (57) ABSTRACT The present invention relates to a V-type filter frame for receiving at least one filter media pack, said V-type filter frame being arranged to be mounted to a filter holding structure, the V-type filter frame comprising first and second side plates and a molded plastic rectangular front plate coupled to the side plates, said side plates each comprising a front edge portion and an opposite rear edge portion and the front plate having a front surface and a back surface, the back surface of the front plate comprising a first coupling portion comprising a first groove configured to receive the front edge portion of the first side plate, a second coupling portion comprising a second groove configured to receive the front edge portion of the second side plate,
a trough for receiving a front edge of a filter media pack, extending between the first and the second coupling portion of the front plate, characterized in that said trough is in fluid connection with each of said first groove and said second
(Continued)

groove when the first and second side plates are coupled to the first and second coupling portions of the front plate respectively.

6 Claims, 5 Drawing Sheets

(58) Field of Classification Search
USPC .................................. 55/478–481, 490–519
See application file for complete search history.

(56) References Cited

U.S. PATENT DOCUMENTS

| 2013/0283743 | A1 | 10/2013 | Williams et al. |
| 2014/0034565 | A1 | 2/2014 | Loken et al. |
| 2014/0096493 | A1* | 4/2014 | Kelmartin .......... B01D 46/0002 55/482 |

FOREIGN PATENT DOCUMENTS

| WO | WO 2014/040657 | 3/2014 |
| WO | WO 2014/040658 | 3/2014 |

OTHER PUBLICATIONS

International Search Report and Written Opinion for International Application No. PCT/EP2014/070485 dated Jun. 8, 2015 in 10 pages.
Office Action received in U.S. Appl. No. 15/513,921, dated Jan. 30, 2019.

* cited by examiner

V-TYPE FILTER FRAME

FIELD OF THE INVENTION

The present invention relates to V-type filter assemblies for removing contaminants from a gas flow.

BACKGROUND OF THE INVENTION

V-type filter assemblies comprising media packs disposed in a frame structure are known. A V-type filter typically includes two or more pairs of filter media packs arranged in a V-configuration. Each filter pack may be comprised of a pleated particulate or gas filter element. A media pack is typically formed from a sheet of filter media, e.g. a fiberglass sheet, or a nonwoven polyester sheet or membrane media or combinations thereof or the like, which is pleated to increase the effective filtering area of the filter body, and provided with cover plates. To provide mechanical support and/or to combine a plurality of media packs, the media pack is typically arranged in a frame structure.

The filter assemblies are typically mounted in a filter holding structure. The filter holding structure may for example comprise a filter housing or filter bank grid, with one or more openings in which the filter assemblies are fitted.

A prior art filter frame for receiving several media packs is shown in U.S. Pat. No. 6,955,696, which discloses a filter frame comprising two side plates, which have male connection elements, and two frame beams having female connection elements, which are interconnected with the male connection elements of the side plates. Thereby a square frame is formed which supports the media packs. In other words, the media packs rest on the frame beams and on support structures of the side plates.

To increase the strength of the frame construction and to prevent gas leakage between frame parts and between the filter media packs and the frame, an adhesive sealant is often used. The application of the adhesive sealant to the components to be joined and sealed often constitutes a major issue in industrial scale manufacture of V-type filter assemblies.

SUMMARY OF THE INVENTION

It is an object of the present invention to provide a filter frame, which facilitates manufacture of V-type filter assemblies.

V-type filter frames can comprise first and second side plates and a front plate which is coupled to the side plates. The V-type filter frames are configured to house one or more pairs of rectangular filter packs, each pair forming a V shape, such that the mouth of the V shape faces the front plate. The front plate comprises a rectangular or square peripherally extending rim and parallel troughs extending between opposite ends of the front plate for receiving the front edges of filter media packs. The front plate comprises one or more apertures configured to be aligned with the mouths of the V shape filter pack pairs. The side plates each comprise a front edge portion, located upstream an airflow, and an opposite rear edge portion, located downstream an airflow, and an inner surface, facing the inner clean side of the filter assembly, and an outer surface, facing the outer soiled side of the filter assembly. A front edge of each filter pack is sealed against the front plate and two opposite side edges of each filter pack are sealed to the first and second side plates respectively.

In accordance with a first aspect of the present invention there is provided a V-type filter frame for receiving at least one filter media pack, said V-type filter frame being arranged to be mounted to a filter holding structure, the V-type filter frame comprising first and second side plates and a molded plastic rectangular front plate coupled to the side plates, said side plates each comprising a front edge portion and an opposite rear edge portion and the front plate having a front surface and a back surface, the back surface of the front plate comprising
a first coupling portion comprising a first groove configured to receive the front edge portion of the first side plate,
a second coupling portion comprising a second groove configured to receive the front edge portion of the second side plate,
a trough for receiving a front edge of a filter media pack, extending between the first and the second coupling portion of the front plate,
characterized in that said trough is in fluid connection with each of said first groove and said second groove when the first and second side plates are coupled to the first and second coupling portions of the front plate respectively.

According to an embodiment, the front plate is molded in a single piece. In accordance with an embodiment the front plate is manufactured by injection molding.

The fluid connection between the troughs and grooves allows the simultaneous application of a fluid sealant to the troughs and grooves of the front plate, even when the front plate and side plates are already connected. With a fluid connection between the troughs and grooves the filter media packs can be sealed to the troughs and the side plates glued to the front plate in a single simultaneous step. Accordingly, the fluid connection between the troughs and grooves facilitates manufacture of V-type filter assemblies.

According to an embodiment, by coupling of the side plate to the front plate, a void is formed in the groove between the front plate and the front edge portion of the side plate.

According to an embodiment, the fluid connection is such that a fluid deposited in the trough can pass through said fluid connection and into a void in the groove between the front plate and the front edge portion of the side plate.

According to an embodiment, the back surface of said front plate comprises at least two troughs for receiving a front edge of a filter media pack, each trough extending between the first and the second coupling portion of the front plate, wherein each trough is in fluid connection with each of said first groove and said second groove when the first and second side plates are coupled to the first and second coupling portions of the front plate respectively.

According to an embodiment, the bottom portion of the troughs of the front plate is sloped downward towards the coupling portions of the front plate so as to direct fluid in the trough towards the fluid connections. According to an embodiment, the bottom portion of the troughs comprises glue guides, e.g. in the form of protrusions at the bottom portion of the troughs creating a distance between a filter media pack edge and the trough bottom, to allow adhesive to spread more efficiently in the trough.

In accordance with an embodiment of the V-type filter frame, the side plate has at least one V-shaped plate portion extending between a front edge portion and an opposite rear edge portion of the side plate, with the mouth of the V shaped portion facing the front edge portion, said at least one V-shaped portion being defined by a channel arranged to receive a side edge of a media pack.

In accordance with an embodiment of the V-type filter frame, the front plate comprises an abutment surface arranged to abut a filter holding structure. The provision of an abutment surface on the front plate ensures optimal sealing properties between the filter holding structure and the filter frame.

In accordance with an embodiment of the V-type filter frame, a sealing member is provided at the abutment surface of the front plate. In accordance with an embodiment of the V-type filter frame, the sealing member comprises a compressible sealing strip.

In accordance with an embodiment of the V-type filter frame, the front plate is coupled to the side plates by means of a snap-lock element. A mechanical locking element such as a snap-lock will allow a person working with the mounting of the filter assembly to handle the frame assembly even before an adhesive has been supplied thereto.

In accordance with an embodiment of the V-type filter frame, the front plate is coupled to the side plates by means of an adhesive. The adhesive for coupling the front plate to the side plates is preferably added to the troughs and flows into the void in the groove between the front plate and the front edge portion of the side plate through the fluid connection. The adhesive can then also simultaneously seal filter media packs to the troughs. The provision of an adhesive has a number of advantages. Among others, the adhesive provides excellent sealing properties such that no air can escape between filter media pack and the front plate or between the side plates and the front plate. Further, it holds the side plates and the front plate together. In combination with the snap-lock element, the mere presence of an adhesive in the space between side plates and front plate will ensure that the snap-lock element cannot snap out of its locked position, thereby increasing the rigidity of the structure.

According to an embodiment, the V-type filter frame further comprises a rear plate coupled to the rear edge portion of the side plates, said rear plate comprising a trough for receiving a rear edge of a filter media pack.

In accordance with an embodiment of the V-type filter frame, the rear plate is engaged with rear edge portions of the first and second side plates by means of a snap lock element. Similar to the use of snap-lock element between the front plate and side plates, this makes the structure easier to handle during assembly.

In accordance with a second aspect of the present invention there is provided a method of a assembling a V-type filter, comprising the steps of a) providing a filter frame as described above with reference to the first aspect, b) inserting filter a media pack into the filter frame, such that a front edge of the filter media pack is received in a trough of the front plate, c) pouring a fluid adhesive into said trough such that said adhesive flows through the fluid connection to fill a void in the groove between the front plate and the front edge portion of the side plate.

The method preferably results in sealing of the filter media pack to the trough and sealing of the side plates to the front plate in a single simultaneous step.

BRIEF DESCRIPTION OF THE DRAWINGS

The invention will now be described in more detail and with reference to the appended drawings in which.

It is to be noted that the appended drawings illustrate only exemplary embodiments of the invention, and are therefore not to be considered limiting of its scope. Other, equally effective embodiments may also be encompassed by the invention as claimed. It is contemplated that features of one embodiment may also be incorporated in other embodiments without further recitation.

DESCRIPTION OF PREFERRED EMBODIMENTS

Figure 1:
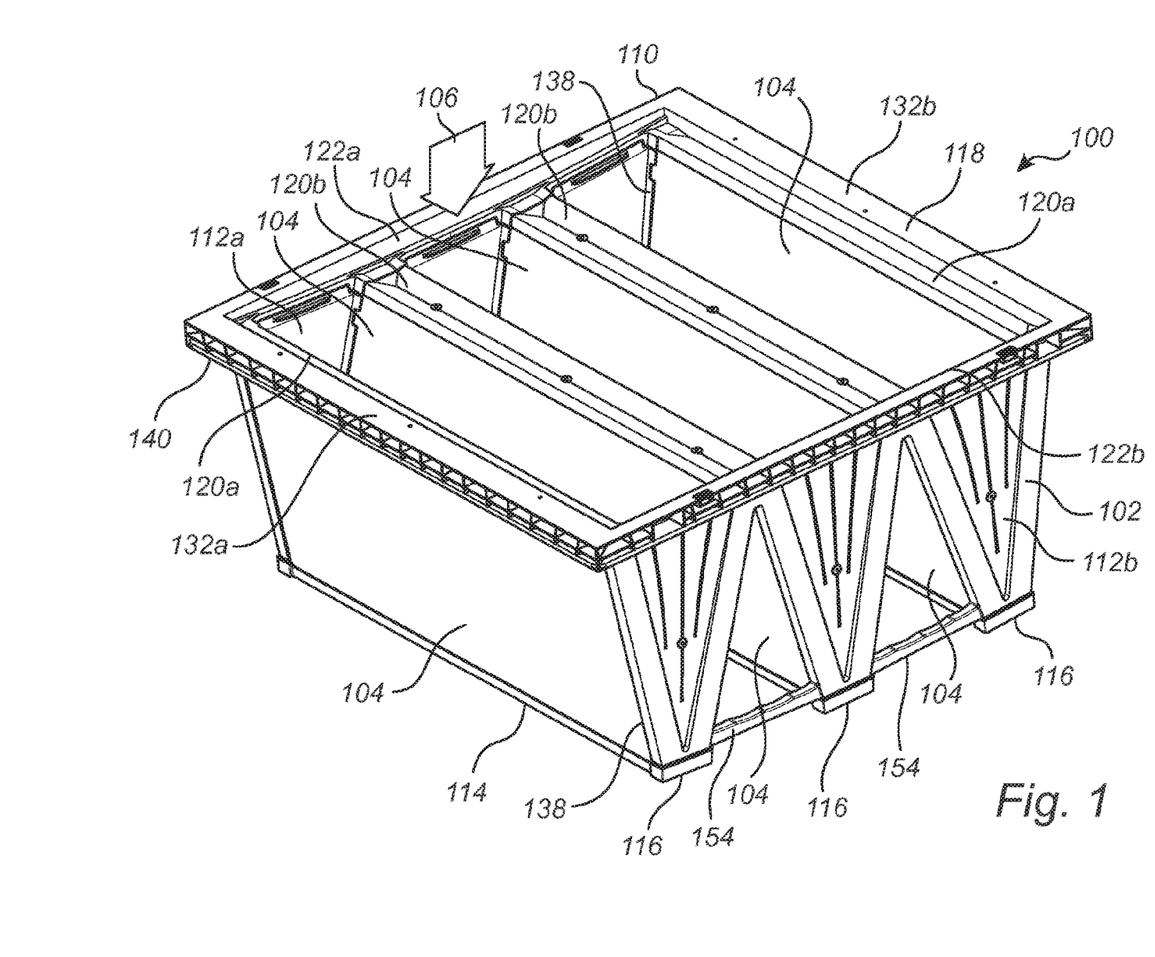
FIG. 1 is a schematic view of a filter assembly comprising a molded plastic rectangular front plate according to the invention.

According to an embodiment of the filter assembly 100, shown in FIG. 1, it comprises an embodiment of the filter frame 102, and several, in this embodiment six, media packs 104 carried by the filter frame 102. Although the invention will be described with reference to a 3V embodiment, it is understood that the invention is equally applicable to 1V, 2V, 4V or more V configurations, i.e. filter assemblies comprising 2, 4, 8, or more filter media packs. The media packs 104 can be of any suitable kind, but typically each media pack 104 comprises a sheet of filter media, which has been pleated to an accordion shape in order to increase the effective filtering area of the filter body. Although the filter is shown having pleated filter media packs, it is contemplated that the filter media packs may be comprised of carbon beds or other gas phase filter medium. The filter media pack 104 may be suitable for at least one of liquid phase, gas phase, particulate or molecular filtration. In one embodiment, the filter media pack 104 may be a molecular filtration media, such as bed of carbon or other gas phase absorber.

The filter frame 102 comprises a front plate 110, two side plates 112a, 112b and a rear plate 114, embodied by three separate plate elements 116. V-type filters are provided in a wide variety of sizes. A common type has a substantially square front plate of about 600×600 mm. The height of the front plate may vary, but is often 20 mm or 25 mm.

The air flow direction through the filter is indicated by arrow 106. The direction of the arrow 106 is orientated as V-type filters are typically utilized, but it is contemplated that flow direction through the filter may also be in the reverse direction.

Figure 2:
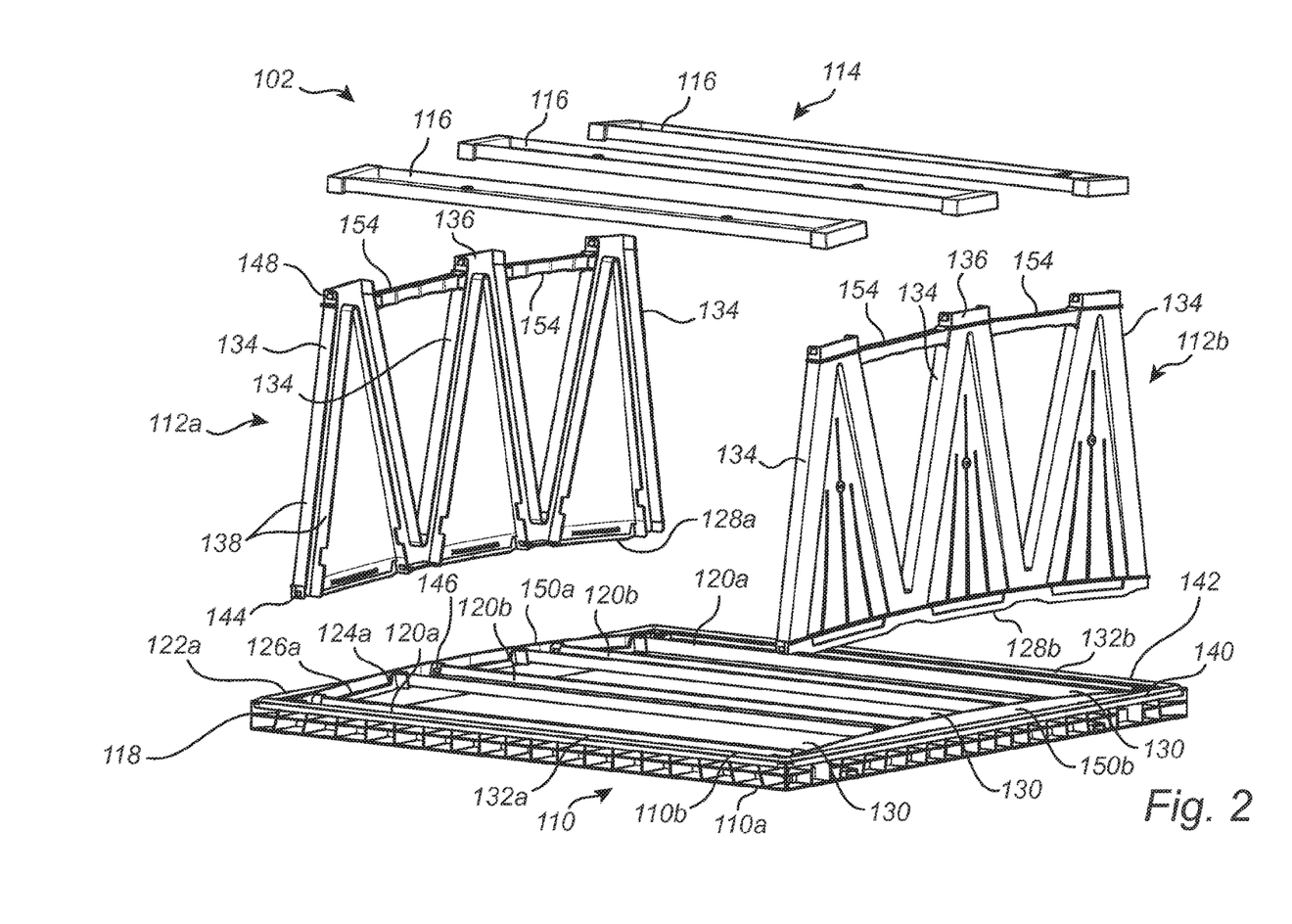
FIG. 2 is a schematic exploded view of an embodiment of a filter frame comprising a molded plastic rectangular front plate according to the invention.

FIG. 2 depicts an exploded view of the filter frame without the filter media packs. The front plate 110 is rectangular and comprises a peripherally extending rim 118, and parallel troughs 120a, 120b extending between opposite rim sides 122a, 122b of the front plate 110. The front plate 110 is formed in a single piece, having a first coupling portion 124a comprising a first groove 126a at rim side 122a, configured to receive the front edge portion 128a of the first side plate, and a second coupling portion 124b (not shown in FIG. 1) comprising a second groove 126b at rim side 122b, configured to receive the front edge portion 128b of the second side plate. Each groove 126 extends along a respective portion of the rim 118 at an inside thereof, and adjacent thereto. The side plates 112a, 112b are arranged at the opposite rim sides 122a, 122b of the front plate 110. The side plates include an exterior side and an interior side. Referring now to FIG. 1, the interior side of each side plate faces the filter elements. Each side plate 112 has a front edge portion 128, adapted to be received in the groove 126. Each side plate 112 extends perpendicular to the front plate 110, and rearwards therefrom. The media packs 104 are plate shaped and extend obliquely substantially in the direction of the air flow from the front plate 110, although they extend close to perpendicular to the front plate 110. The media packs 104 are arranged side by side, leaning alternately to one side and to the other side, thereby forming a zigzag structure. More particularly, they are arranged in pairs, each pair forming a V shape, such that the mouth of the V shape faces the front plate 110. A front edge of each media pack 104 is received in one of the troughs 120, and apertures 130 between the troughs 120 are aligned with the mouths of the V shapes. Each side plate 112 has three V-shaped portions 134 extending between the front edge portion 128 and an opposite rear edge portion 136 of the side plate 112, with the mouth of each V-shaped portion 134 facing the front edge portion 128. The V-shaped portions 134 are joined along a minor fraction of their length, extending from the mouth towards the other end, while there are gaps between them along a major part of their length. Reinforcing elements 154 may be provided extending between two adjacent V-shaped portions to further increase the structural rigidity of the side plate 112. These reinforcing elements 154 can also serve as handles when handling the side plates 112 or (semi-)assembled filter frame assemblies 100. Each V-shaped portion 134 is defined by a channel, having side walls 138. Each V-shaped channel has is adapted to receive side edge portions, of two media packs 104. Of course, it is also possible within the scope of the appended claims for the side plates 112 to have additional or less than three V-shaped portions, such as one, two, four or more. Also, the side plates 112 may not have V-shaped portions at all but may for example be provided in the form of covering having a rectangular or trapezoidal shape or similar without openings between adjacent pairs of media packs. Each plate element 116 of the rear plate 114 covers rear edge portions of two media packs 104 forming a V-shape. The plate elements 116 each extend between, and are attached to, a respective fraction of the rear edge portion 136 of each side plate 112. Consequently, the front plate 110, the side plates 112, and the rear plate 114 support each other to form a strong filter frame 102, which carries the media packs 104.

Figure 3:
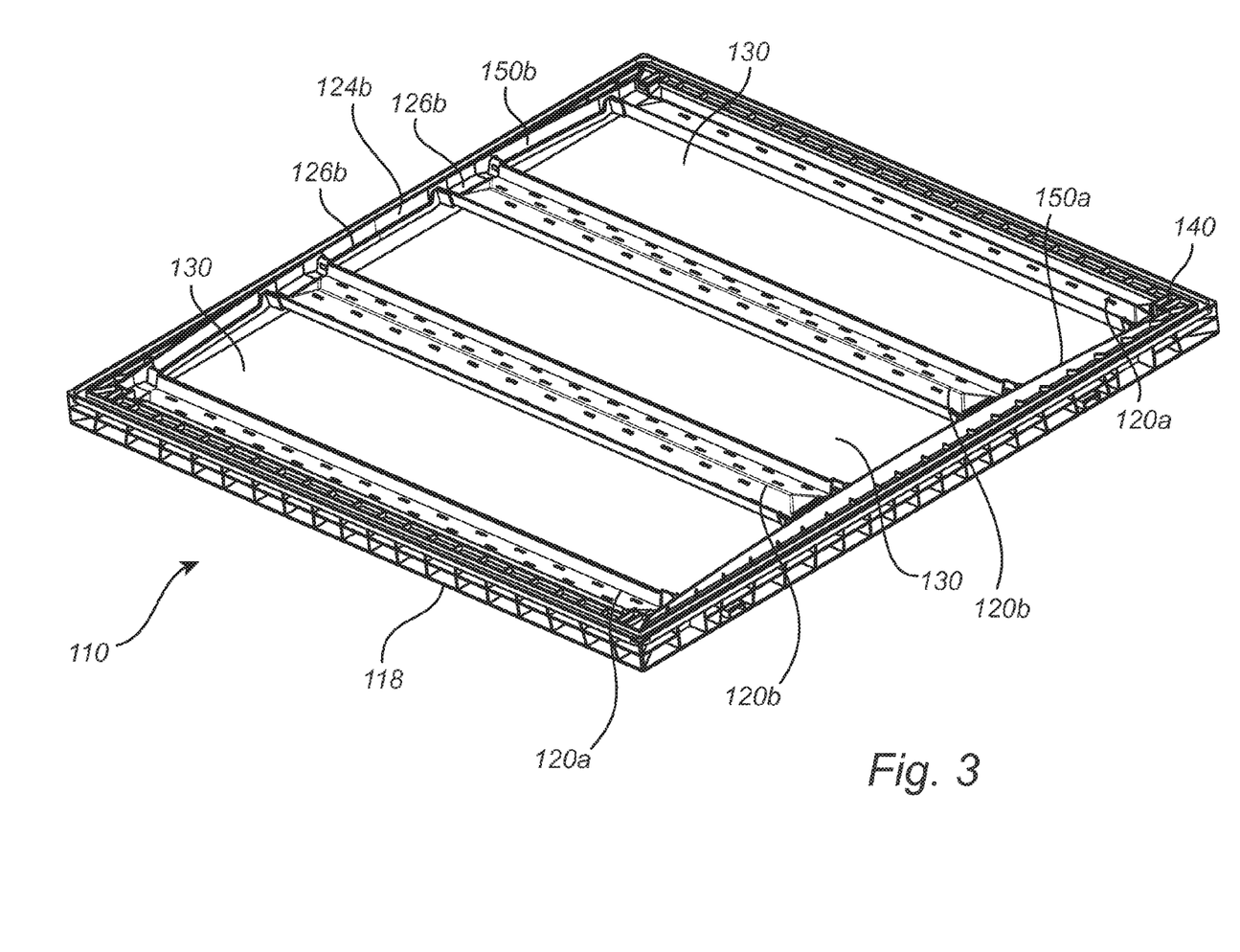
FIG. 3 is a schematic view of a molded plastic rectangular front plate according to the invention.

As shown in FIG. 3, the front plate 110 consists of a single molded plastic element having a front surface 110a and a back surface 110b. The front plate 110 is rectangular and comprises a peripherally extending rim 118, and parallel troughs 120 extending between opposite rim sides 112a, 122b of the front plate 110. The rim 118 typically has a substantially rectangular cross section and may be formed of solid plastic, but is typically formed at least partially hollow to reduce weight and material consumption. The troughs 120 comprise an open channel structure defined by a bottom wall and two opposing longitudinal side walls. The ends of the open channel structure are defined by the opposite rim sides 112a, 122b of the front plate and grooves 126 such that the inner volume of the troughs communicates with the grooves 126. The front plate comprises two side troughs 120a arranged adjacent and parallel to opposite rim sides 132a, 132b. The side troughs 120a are configured to receive the front edge portion of the first and last filter media pack respectively. In a 1V configuration these may be the only troughs. In a 2V, 3V, or more V, configuration the front plate comprises additional intermediate trough(s) 120b arranged between the side troughs 120a. The intermediate troughs 120b are each configured to receive the adjacent front edge portions two adjacent filter media packs 104. Thus, a 2V configuration will have one intermediate trough, a 3V configuration will have two intermediate troughs, etc. In an embodiment, the bottom portion of the troughs of the front plate is sloped downward towards the coupling portions of the front plate so as to direct fluid in the trough towards the fluid connections. The troughs may also be provided with glue guides, e.g. in the form of protrusions at the bottom portion of the troughs creating a distance between the filter media pack edge and the trough bottom, to allow adhesive to spread more efficiently in the trough.

The front plate 110 comprises several different integral functional portions. The functional portions include coupling portions 124a, 124b for connecting the front plate 110 to the side plates 112a, 112b, troughs 120 for receiving the front edges of the filter media packs 104, and an abutment surface 140 for mounting and sealing the front plate against a holding structure, such as a filter housing or filter bank grid (not shown). The abutment surface 140 typically has a sealing member 142, here in the form of a sealing strip made from polyurethane or similar. As will be described below, the filter frame assembly is to be fastened by means of clamps or similar, which firmly press the filter frame assembly against a filter holding structure, such as a filter housing or filter bank grid (not shown). When this is done the sealing member 142 will be compressed.

Figure 5A:
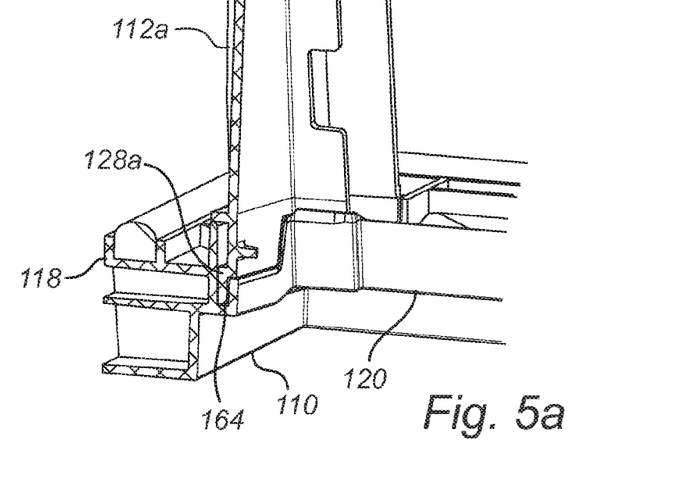
FIGS. 5a and 5b are cross-sectional views of filter frame parts of the filter frame.
Figure 5B:
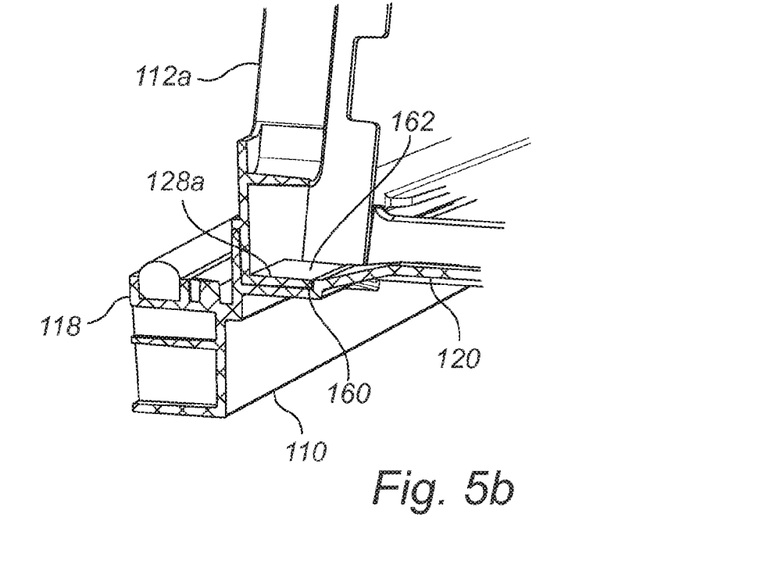

In the V-type filter frame, the inner volume of the troughs 120 communicates with the grooves 126. This allows for a fluid added to the troughs 120 to flow, by force of gravity or capillary force into the grooves 126. As shown in FIGS. 5a and 5b, the troughs 120 are fluidly connected with the grooves 126 by channels 160 starting at the bottom 162 of the troughs 120, where the side plates 112 are connected to the front plate 110. In an embodiment, the bottom portion of the troughs of the front plate is sloped downward towards the coupling portions of the front plate so as to direct fluid in the trough towards the fluid connections. This ensures that fluid added to the troughs 120 is brought into contact with the channels 160. The troughs may also be provided with glue guides, e.g. in the form of protrusions at the bottom portion of the troughs creating a distance between the filter media pack edge and the trough bottom, to allow adhesive to spread more efficiently in the trough.

The depth of the groove 126 is slightly larger than the length of the front edge portion 128 of the side plate to be inserted. Accordingly when the side plate 112 is coupled to the front plate 110, a void 164 is formed in the groove 126 between the front plate and the front edge portion of the side plate.

According to an embodiment, the channel 160 is such that a fluid deposited in the trough 120 can pass through said channel and into a void 164 in the groove between the front plate and the front edge portion of the side plate. The channel typically has a depth of about 0.1-0.5 mm. The width of the channel is typically greater than the depth and typically above 1 mm, such as above 5 mm or above 10 mm. The width of the channel is typically below 100 mm. The length of the channel, i.e. the distance between the bottom of the trough and the void is typically below 100 mm.

The front plate 110 optionally has two support structures 150a, 150b for improving the resistance to deformation of the front plate. Each support structure 150 consists of a plate-like element protruding in a plane substantially perpendicular to the back surface 110b of the front plate 110 and extending substantially the length of a peripheral side of the back surface of the front plate such that the thickness of the front plate in the direction from the front surface 110a to the back surface 110b is increased towards the middle and reduced towards the ends of the front plate side. In a lateral view as shown in FIG. 3 and FIG. 4, the support structure 150 may have the shape of a circular segment. The support structures 150a, 150b are arranged directly adjacent the grooves 126a, 126b configured to receive the front edge portions of the side plates.

In one embodiment, the support structures 150 extend over about 95% of the length of the side 122 of the back surface 110b of the front plate. In another embodiment, the support structures extend over about 80% of the length of the side 122 of the back surface of the front plate. The support structures have a thickness in the range of 1 mm to 3 mm and a maximum height of the support structure, i.e. the height of the support structure where the perpendicular protrusion is highest, in the range of 20 mm to 40 mm.

The front plate 110 is manufactured by injection molding of a suitable thermoplastic, e.g. acrylonitrile butadiene styrene (ABS) copolymer. The addition of the support structures 150a, 150b to the back surface 110b of the front plate causes the centre of gravity of the front plate to be displaced in a direction from the front surface to the back surface of as compared to an identical front plate side but without the support structure. This induces an internal tension in the molded plastic material during injection molding, which tension counteracts the stress on the front plate caused by the air pressure load during use.

In accordance with an embodiment of the molded plastic rectangular front plate 110, the centre of gravity of the front plate is displaced a distance corresponding to at least 10%, such as at least 15%, such as at least 20%, of the height of the front plate without the support structure. In a front plate having a height, without the support structure, of 20 mm, this would correspond to a displacement of centre of gravity of the front plate by at least 2 mm, such as at least 3 mm, such as at least 4 mm. In a front plate having a height, without the support structure, of 25 mm, this would correspond to a displacement of centre of gravity of the front plate by at least 2.5 mm, such as at least 3.75 mm, such as at least 5 mm.

The support structure extends along a major portion of the length of a peripheral side of the back surface of the front plate. By "a major portion of the length" is meant at least 50% of the length of a side of the back surface of the front plate. In accordance with an embodiment, the support structure extends along at least 50%, such as at least 60%, such as at least 70%, such as at least 80%, such as at least 90%, of the length of a side of the back surface of the front plate.

In accordance with an embodiment of the molded plastic rectangular front plate, the thickness of the support structure is in the range of 1 mm to 5 mm, such as in the range of 1 mm to 4 mm, such as in the range of 1 mm to 3 mm.

In accordance with an embodiment of the molded plastic rectangular front plate, the maximum height of the support structure, i.e. the height of the support structure where the perpendicular protrusion is highest, is in the range of 10 mm to 50 mm, such as in the range of 10 mm to 40 mm, such as in the range of 10 mm to 30 mm.

In accordance with an embodiment of the molded plastic rectangular front plate, the maximum height of the support structure, i.e. the height of the support structure where the perpendicular protrusion is highest, amounts to in the range of 10 to 80%, such as in the range of 20 to 70%, such as in the range of 30 to 60%, of the thickness of the front plate in the direction from the front surface to the back surface.

Figure 4A:
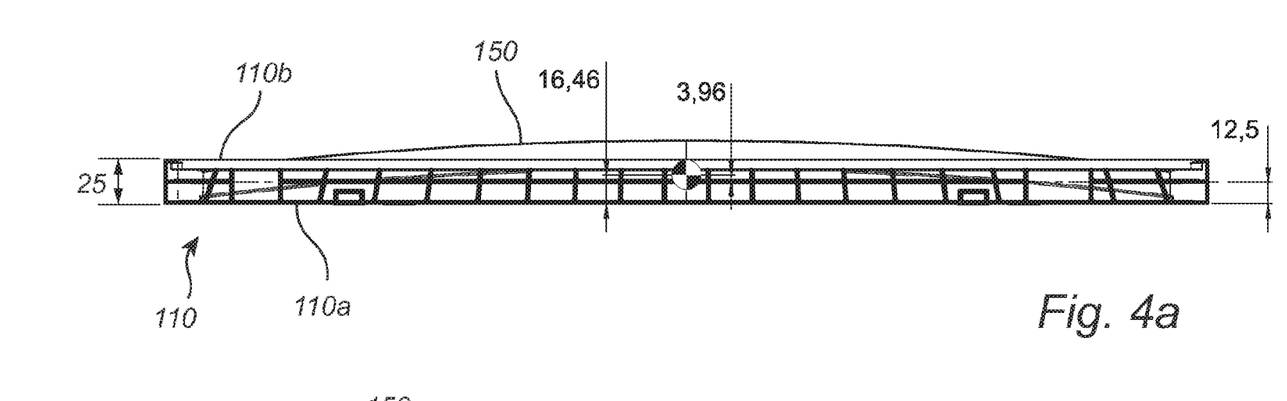
FIGS. 4a and 4b are schematic side views of embodiments of a molded plastic rectangular front plate according to the invention.
Figure 4B:
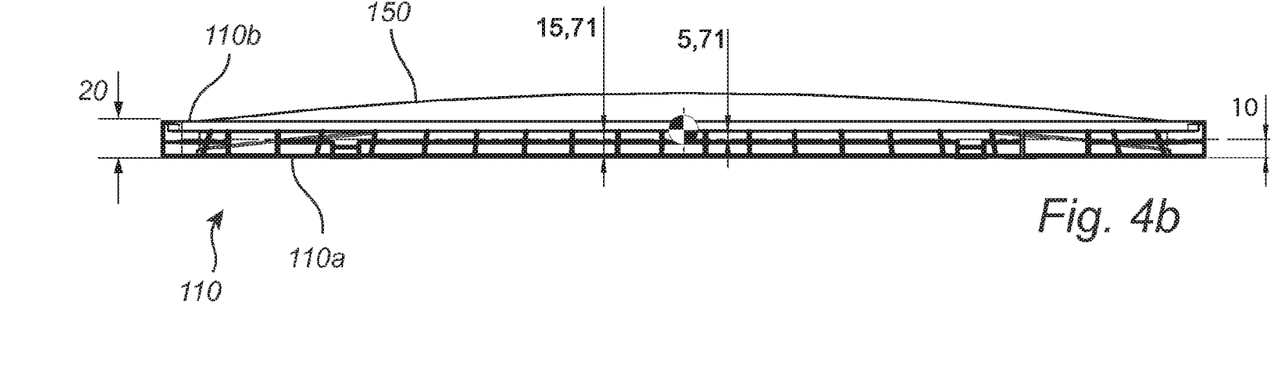

FIGS. 4a and 4b show two different embodiments of the front plate 110.

FIG. 4a shows a front plate having a height, without the support structure, of 20 mm. Centre of gravity without the support structure is 10 mm from the front surface. Centre of gravity with the support structure is 15.71 mm from the front surface. In this embodiment, the support structure extends along about 90% of the length of a side of the back surface of the front plate.

FIG. 4b shows a front plate having a height, without the support structure, of 25 mm. Centre of gravity without the support structure is 12.5 mm from the front surface. Centre of gravity with the support structure is 16.46 mm from the front surface. In this embodiment, the support structure extends along about 80% of the length of a side of the back surface of the front plate.

An important part of the filter frame structure is the engagement between the side plates 112 and the front plate 110. As mentioned above, each one of the side plates 112 has been received in a respective groove 126 of the front plate 110. The grooves and front edge portions of the side plates are shaped to fit together. The shape and dimensions of the grooves may vary along the length of the groove. For example, the shape of the groove where the troughs connect to the rim 118 is different from the shape of the groove between the troughs 120. Correspondingly, the shape of the front edge where the troughs connect to the rim 118 is different from the shape of the front edge between the troughs. In order to secure a proper engagement between the front plate 110 and the side plates 112, each side plate, as shown in FIG. 2, is provided with retainment members 144, and the front plate 110 is provided with a complementary retainment members 146 for each side plate 112. The retainment members 144 of each side plate 112 comprise a snap-lock element. The complementary retainment member 146 comprises a recess. When the side plate 112 is connected to the front plate 110, the snap-lock element is received in the recess. Thereby the side plate 112 is in fixed engagement with the front plate 110. The retainment members and complementary retainment members ensure a reliable coupling between the side plates 112 and the front plate 110 even without the use of any adhesives such that the filter frame can be handled, e.g. lifted and moved around, without the need of any temporary securing means or similar.

The filter frame is assembled as follows. The front plate 110, comprising the grooves 126 at the two opposite rim sides 112a, 122b thereof is provided. The first and second side plates 112 are provided and mounted at the front plate 110. For each side plate 112 the mounting includes inserting a front edge portion 128 of the side plate 112 into a respective groove 126, and forcing the retainment members 144 into engagement with the complementary retainment members 146 of the front plate 110. Thereby a part of the filter frame 102 which is ready to receive the media packs 104 has been assembled. In order to complete the assembling process to a complete filter assembly 100, the next step thus is to mount the media packs 104 and then the plate elements 116 of the rear plate 114 are mounted, wherein they are forced into engagement with the rear edge portions 136 such that snap-lock elements 148 of the side plates 112 snaps into a locking position in the corresponding part in each rear plate 116. As mentioned earlier, the filter assembly is now ready to be handled and could for example be transported to a different location without the necessity of any temporary securing means or similar.

And then, in a last step of assembling the filter frame, an adhesive is used to seal and fixate the filter assembly 100. Adhesive is used to seal and fixate the filter packs to the troughs of the front and rear plates and to the channels of the side plates.

As described above, the adhesive used to seal and fixate the filter packs to the troughs of the front plate also spreads via the channels to at least partially seal and fixate the connections between the front plate and the side plates. The fluid connection between the troughs and grooves allows the simultaneous application of a fluid sealant to the troughs and grooves of the front plate, even when the front plate and side plates are already connected. With a fluid connection between the troughs and grooves the filter media packs can be sealed to the troughs and the side plates glued to the front plate in a single simultaneous step. Accordingly, the fluid connection between the troughs and grooves facilitates manufacture of V-type filter assemblies.

The mere presence of adhesive in the spaces between the different constructional details will prevent the snap-lock elements from leaving their locked position, which adds rigidity to the structure even before the adhesive has cured. Obviously, curing will further increase rigidity and stability of the structure by bonding the front plate, side plates and rear plate(s) together. Since the retainment members 144 will be glued into engagement with the complementary retainment members, the snap-lock connection will become even stronger.

Thereafter, the filter frame assembly 100 is inserted and secured to a filter holding structure, such as a filter housing or filter bank grid (not shown). Typically, the filter frame assembly is clamped to the filter holding structure by means of a plastic or metal clamp which is fixed to the filter holding structure by means of a bolt and a fly nut or similar. Thereby, the filter frame assembly can be tightly squeezed between the clamp and the filter holding structure without the use of through bolts or similar that would jeopardize tightness of the construction. When in use, the forces acting on the filter media packs 104 due to the air flow therethrough will be counteracted by the support structures and the internal tension in the front plate, such that the sealing properties between the front plate and the filter holding structure, and between the side plates 112 and the front plate 110, can be maintained at all times.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A V-type filter frame for receiving at least one filter media pack, said V-type filter frame being arranged to be mounted to a filter holding structure, the V-type filter frame comprising first and second side plates and a molded plastic rectangular front plate coupled to the side plates, said side plates each comprising a front edge portion and an opposite rear edge portion and the front plate having a front surface and a back surface, the back surface of the front plate comprising:
   a first coupling portion comprising a first groove configured to receive the front edge portion of the first side plate,
   a second coupling portion comprising a second groove configured to receive the front edge portion of the second side plate,
   a first trough for receiving a front edge of a filter media pack, extending between the first and the second coupling portions of the front plate,
   wherein, when the first and second side plates are coupled to the first and second coupling portions of the front plate respectively, there is a void at the first groove between the front plate and the front edge portion of the first side plate, and a void at the second groove between the front plate and the front edge portion of the second side plate, wherein said first trough is in fluid connection with each of said first groove and said second groove, such that a fluid deposited in the first trough can pass through said fluid connection and into the voids, said fluid connection thereby allowing the simultaneous application of a fluid sealant to the first trough and grooves of the front plate.

2. A V-type filter frame according to claim 1, wherein the back surface of said front plate comprises the first trough and at least a second trough for receiving a front edge of a filter media pack, each of the troughs extending between the first and the second coupling portion of the front plate, wherein each of the troughs is in fluid connection with each of said first groove and said second groove when the first and second side plates are coupled to the first and second coupling portions of the front plate respectively.

3. A V-type filter frame according to claim 1, wherein the front plate further comprises an abutment surface arranged to abut a filter holding structure when mounted thereto.

4. A V-type filter frame according to claim 1, wherein a bottom portion of the first trough of the front plate is sloped downward towards the first coupling portion of the front plate so as to direct fluid in the first trough towards the first coupling portion.

5. A V-type filter frame according to claim 1, further comprising a rear plate coupled to the rear edge portion of the side plates, said rear plate comprising a trough for receiving a rear edge of a filter media pack.

6. A method of assembling a V-type filter, comprising the steps of:
   providing a filter frame according to claim 1,
   inserting a filter media pack into the filter frame, such that a front edge of the filter media pack is received in the first trough of the front plate, and
   pouring a fluid adhesive into said first trough such that said adhesive flows through the fluid connection to fill the voids at the grooves between the front plate and the front edge portion of the first and second side plates, respectively.

* * * * *